(12) United States Patent
Lissajoux et al.

(10) Patent No.: US 10,055,999 B2
(45) Date of Patent: Aug. 21, 2018

(54) METHOD AND DEVICE FOR GENERATING A RESULTING SETPOINT TRAJECTORY OF AN AIRCRAFT, RELATED COMPUTER PROGRAM PRODUCT AND AIRCRAFT

(71) Applicant: THALES, Courbevoie (FR)

(72) Inventors: Sylvain Lissajoux, Toulouse (FR); Eric Guillouet, Toulouse (FR); Christophe Garnavault, Toulouse (FR); Joël Bosson, Toulouse (FR)

(73) Assignee: THALES, Courbevoie (FR)

( * ) Notice: Subject to any disclaimer, the term of this patent is extended or adjusted under 35 U.S.C. 154(b) by 61 days.

(21) Appl. No.: 15/319,489

(22) PCT Filed: Jun. 5, 2015

(86) PCT No.: PCT/EP2015/062575
§ 371 (c)(1),
(2) Date: Dec. 16, 2016

(87) PCT Pub. No.: WO2015/193125
PCT Pub. Date: Dec. 23, 2015

(65) Prior Publication Data
US 2017/0323571 A1 Nov. 9, 2017

(30) Foreign Application Priority Data
Jun. 16, 2014 (FR) .................................. 14 01360

(51) Int. Cl.
*G01C 23/00* (2006.01)
*G08G 5/00* (2006.01)
*G05D 1/02* (2006.01)

(52) U.S. Cl.
CPC ......... *G08G 5/0039* (2013.01); *G01C 23/005* (2013.01); *G05D 1/0202* (2013.01); *G08G 5/0052* (2013.01)

(58) Field of Classification Search
None
See application file for complete search history.

(56) References Cited

U.S. PATENT DOCUMENTS

2009/0076717 A1 3/2009 Goutelard et al.
2012/0253555 A1 10/2012 Stange et al.
2013/0179009 A1 7/2013 Gershzohn et al.

OTHER PUBLICATIONS

International Search Report for PCT/EP2015/062575, dated Sep. 14, 2015.

*Primary Examiner* — Bhavesh V Amin
(74) *Attorney, Agent, or Firm* — B. Aaron Schulman, Esq.; Stites & Harbison, PLLC (57) ABSTRACT

This method makes it possible to generate a resulting setpoint trajectory of an aircraft, a guiding system controlling the trajectory of the aircraft relative to the resulting setpoint trajectory.
The generating method is implemented by an electronic device and comprises selecting at least one mode from among several operating modes, acquiring a setpoint trajectory prepared by a flight management system, obtaining an alternative setpoint trajectory from an element from among a module for computing a trajectory and an external generating system, and generating the resulting setpoint trajectory, which includes one or several segments of the alternative setpoint trajectory for the period of time corresponding to the selection of another mode.

19 Claims, 5 Drawing Sheets

METHOD AND DEVICE FOR GENERATING A RESULTING SETPOINT TRAJECTORY OF AN AIRCRAFT, RELATED COMPUTER PROGRAM PRODUCT AND AIRCRAFT

TECHNICAL FIELD OF THE INVENTION

The present invention relates to a method for generating a resulting setpoint trajectory of an aircraft, intended for at least one receiving system from among at least a guiding system of the aircraft, the resulting setpoint trajectory including at least one trajectory segment for at least one axis from among a lateral axis, a vertical axis and a longitudinal axis associated with the aircraft. The guiding system of the aircraft is configured to control the trajectory of the aircraft relative to said resulting setpoint trajectory. The method is implemented by an electronic device generating said trajectory.

The invention also relates to a non-transitory computer-readable medium including a computer program product including software instructions which, when they are implemented by a computer, carry out such a method.

The invention also relates to an electronic device for generating such a trajectory.

The invention also relates to an aircraft, such as an airplane or a helicopter, comprising such an electronic device for generating the resulting setpoint trajectory, a flight management system, an external setpoint trajectory generating system, one or several guiding systems, such as an automatic piloting device and/or electrical flight commands and/or an auto-thrust device, the generated resulting setpoint trajectory being suitable for being sent to at least one receiving system from among the guiding system(s) of the aircraft.

The invention applies to the field of avionics, and more particularly to that of flight conduct systems. The usage field of this invention relates to the unfolding of the flight by an aircraft broadly speaking, including the taxiing phases. The invention relates to all of the usage phases of the flight conduct systems from the departure to the arrival of the aircraft.

BACKGROUND OF THE INVENTION

Currently, the conduct of the flight of an aircraft involves different automatic operations that involve many systems. Although the current flight conduct systems have participated considerably in decreasing the accident rate, the fact nevertheless remains that they are placed incrementally by successively adding functions and equipment. This superposition of systems is the historical result of the evolution of technologies in recent decades.

It is thus very common today to arrange equipment on board an aircraft:
- a flight management system (FMS): it develops trajectory setpoints to produce a flight plan;
- an automatic pilot, also called auto flight control system (AFCS): it performs the guiding function, and to that end is suitable for controlling the setpoints provided by the flight management system (FMS). The use of the FMS combined with the use of the automatic pilot corresponds to the maximum level of automation. The automatic pilot also makes it possible to control the trajectory through the acquisition of parameters set by the crew and by holding these parameters;
- an auto-throttle (AT): on fixed-wing aircraft, it is responsible for managing the thrust; and
- a flight control system (FCS): it is responsible for the short-term stabilization of the aircraft, and also allows control of the setpoints from the auto flight control system (AFCS).

This equipment is designed as independent systems having their own interfacing means, i.e., a specific interface for the flight management system, also called multifunctional control display unit (MCDU), a dedicated control station for the auto flight control system, generally made up of rotary controls and buttons, also called flight guidance control panel (FGCP), a control stick or mini stick for the flight control system (FCS), one or several throttles or levers for managing the power of one or several engines.

The complexity caused by this plurality of systems currently plays a non-negligible role in the workload of the crew. In order to be able to perform a commercial flight, the crew must then master several complex and dynamic systems, often operating at different levels of automation.

This multiplicity of systems results in increased costs, both in terms of design and training for the crews that must use them.

Furthermore, this plurality of systems and interfaces may prove to be a source of confusion for the crew. At the origin of incidents/accidents such as loss of control of the aircraft, there is often an incorrect identification of the situation by the crew, or even confusion regarding the system statuses.

SUMMARY OF THE INVENTION

One aim of the invention is therefore to propose a method and device for generating a resulting setpoint trajectory of an aircraft, intended for at least one receiving system from among a guiding system of the aircraft, the guiding system of the aircraft being configured to control the trajectory of the aircraft relative to said resulting setpoint trajectory, in order to reduce the complexity of the interfaces of the aforementioned avionics systems, then making it possible to improve the safety of the flight of the aircraft and decrease the workload for the crew.

To that end, the invention relates to a method for generating a resulting setpoint trajectory of an aircraft, wherein the method further comprises the following steps:
- selecting at least one operating mode from among a plurality of operating modes,
- acquiring a setpoint trajectory prepared by the flight management system, the prepared setpoint trajectory including one or several trajectory segments for at least one axis among the lateral axis, the vertical axis and the longitudinal axis,
- obtaining an alternative setpoint trajectory from an element among the module computing a trajectory and an external system for generating a setpoint trajectory, said external generating system being separate from the flight management system, the alternative setpoint trajectory including one or several trajectory segments for at least one axis among the lateral axis, the vertical axis and the longitudinal axis,
- generating the resulting setpoint trajectory, the resulting setpoint trajectory including the segment(s) of the prepared setpoint trajectory acquired for the period of time corresponding to the selection of a first operating mode, and the segment(s) of the alternative setpoint trajectory obtained for the period of time corresponding to the selection of another operating mode.

The generating method then makes it possible, via the selection of at least one operating mode from among a plurality of operating modes and the generation of the resulting setpoint trajectory based on the selected operating mode(s), to centralize the generation of the resulting setpoint trajectory within the electronic generating device. The generating device then performs a trajectory-based guiding function around a single resulting setpoint trajectory, which makes it possible to improve the flight safety and facilitate the crew's work. The organization and sharing of tasks between the crew and the flight conduct systems are thus reconceived around the aircraft trajectory.

A setpoint trajectory refers to a trajectory intended to be used by an avionics system as a reference to control the trajectory of the aircraft. In other words, each corresponding avionics system is configured to control the trajectory of the aircraft relative to said setpoint trajectory.

A resulting setpoint trajectory refers to the setpoint trajectory delivered at the output of the generating device for the receiving system(s) from among the guiding system(s). In other words, the resulting setpoint trajectory results from the generation done from the prepared setpoint trajectory and/or the alternative setpoint trajectory. The resulting setpoint trajectory then results from the centralization done by the generating device.

According to other advantageous aspects of the invention, the method includes one or more of the following features, considered alone or according to all technically possible combinations:
  the acquiring step is done only when the first operating mode is selected;
  the obtaining step is done only when the other operating mode is selected;
  when several operating modes are selected, the other operating mode takes priority relative to the first operating mode, and during the generating step, the resulting setpoint trajectory is formed, for the period of time corresponding to the selection of these multiple operating modes, by the segment(s) of the obtained alternative setpoint trajectory;
  the aircraft further includes at least one protection system of the aircraft, primary control members, such as a control stick or mini-stick, a rudder bar or a throttle, one or several additional control members and secondary control members, such as a selector or rotary member of a control panel, a touch-sensitive key of a touchscreen, or a voice command system, and
  when the other selected operating mode is a second operating mode, the alternative setpoint trajectory is a trajectory computed by the trajectory computing module, based on at least one guiding setpoint, each guiding setpoint being developed from at least one constraint from a corresponding protection system or being selected by a crew of the aircraft via one of the control members;
  the aircraft further includes primary control members, such as a control stick or a mini-stick, a rudder bar or a throttle,
  the method further comprises acquiring a mechanical property relative to one of the primary control members, and
  when the other selected operating mode is a third operating mode, the alternative setpoint trajectory is a trajectory computed by the trajectory computing module (40) based on the mechanical property acquired for one of the primary control members;
  when the other selected operating mode is a fourth operating mode, the alternative setpoint trajectory is a setpoint trajectory received from the external generating system;
  the third operating mode takes priority over the second operating mode, the second operating mode taking priority over the fourth operating mode;
  each operating mode can be selected independently for each axis from among the lateral axis, the vertical axis and the longitudinal axis;
  for each trajectory segment, at least one aeronautic characteristic of the aircraft is constant, each aeronautic characteristic being chosen from among the group consisting of: a turn radius, a route, a ground gradient, an altitude, a ground speed, a vertical speed, a roll angle, a pitch attitude, a heading, a load factor, a lateral acceleration, a roll rate, a pitch attitude rate of change, a gradient acceleration, a gradient acceleration rate of variation, a power level such as a specific engine rating, a performance level such as a better rate of climb, a rate of acceleration and a relative airspeed (CAS, TAS, MACH), a position and a side-slip angle;
  at least one trajectory segment includes one or several predefined waypoints of the aircraft;
  the aircraft further includes primary control members, such as a control stick or a mini-stick, a rudder bar or a throttle,
  the method further comprises acquiring a mechanical property relative to one of the primary control members, and
  the selection of the operating mode is done based on the mechanical property acquired for the primary control member associated with the considered axis from among the lateral axis, the vertical axis and the longitudinal axis;
  during the selecting step, the switch to the first operating mode is done only when the primary control member associated with the considered axis from among the lateral axis, the vertical axis and the longitudinal axis is in an idle position, said idle position being a corresponding position of the primary member when it is not manipulated, said primary member including one or several idle positions;
  during the selecting step, the switch to the first operating mode is done via a specific button,
  the specific button preferably being arranged against a primary control member;
  the guiding setpoint(s) are chosen from among the group consisting of: a turn radius setpoint, a route setpoint, a ground gradient setpoint, an altitude setpoint, a ground speed setpoint, a vertical speed setpoint, a roll angle setpoint, a pitch attitude setpoint, a heading setpoint, a load factor setpoint, a lateral acceleration setpoint, a roll rate setpoint, a pitch attitude rate of change setpoint, a gradient acceleration setpoint, a gradient acceleration rate of variation setpoint, a power level setpoint, a performance level setpoint, a ground trajectory setpoint associated with a waypoint, a relative airspeed setpoint (CAS, TAS, MACH), a side-slip angle setpoint and a position setpoint; and
  the aircraft further includes at least one protection system of the aircraft, at least one data display system, and
  the method further comprises sending the resulting setpoint trajectory to at least one receiving system from among a guiding system, at least one protection system and at least one display system.

The invention also relates to a non-transitory computer-readable medium including a computer program product including software instructions which, when implemented by a computer, carry out the method as defined above.

The invention also relates to an electronic generating device for generating a resulting setpoint trajectory of an aircraft, intended for at least one receiving system from among at least a guiding system of the aircraft, the resulting setpoint trajectory including at least one trajectory segment for at least one axis from among a lateral axis, a vertical axis and a longitudinal axis associated with the aircraft, the guiding system being configured to control the trajectory of the aircraft relative to said resulting setpoint trajectory, the generating device comprising:
a trajectory computing module for computing a trajectory,
selecting means for selecting at least one operating mode from among a plurality of operating modes,
acquiring means for acquiring a setpoint trajectory prepared by a flight management system, the prepared setpoint trajectory including one or several trajectory segments for at least one axis among the lateral axis, the vertical axis and the longitudinal axis,
obtaining means for obtaining an alternative setpoint trajectory from an element among the trajectory computing module and an external generating system, the alternative setpoint trajectory including one or several trajectory segments for at least one axis among the lateral axis, the vertical axis and the longitudinal axis, said external generating system being separate from the flight management system,
generating means for generating the resulting setpoint trajectory, the resulting setpoint trajectory including the segment(s) of the prepared setpoint trajectory acquired for the period of time corresponding to the selection of a first operating mode, and the segment(s) of the alternative setpoint trajectory obtained for the period of time corresponding to the selection of another operating mode.

The invention also relates to an aircraft, such as an airplane or a helicopter, comprising an electronic device for generating a resulting setpoint trajectory, a flight management system, an external setpoint trajectory generating system, one or several guiding systems, such as an automatic piloting device and/or electrical flight commands and/or an auto-thrust device, wherein the generating device is as defined above, the generated resulting setpoint trajectory being suitable for being sent to at least one receiving system from among the guiding system(s) of the aircraft.

BRIEF DESCRIPTION OF THE DRAWINGS

These features and advantages of the invention will appear upon reading the following description, provided solely as a non-limiting example, and done in reference to the appended drawings, in which:

FIG. 1 is a diagrammatic illustration of an aircraft according to the invention, the aircraft comprising a flight control system, an engine control unit, an automatic pilot device, a guiding system of the aircraft, protection systems of the aircraft, data display systems, one or several control sticks or a mini-sticks, one or several rudder bars and a throttle assembly each forming a primary control member able to be manipulated to pilot the aircraft, and an electronic device for generating a resulting setpoint trajectory of an aircraft, intended for at least one receiving system among the guiding system, the protection systems and the display systems, the generating device comprising means for selecting at least one operating mode from among a first, second, third and fourth operating mode, means for acquiring a setpoint trajectory prepared by the flight management system, means for obtaining an alternative setpoint trajectory and means for generating the resulting setpoint trajectory based on the selected operating mode;

DETAILED DESCRIPTION OF PREFERRED EMBODIMENTS

Figure 1:
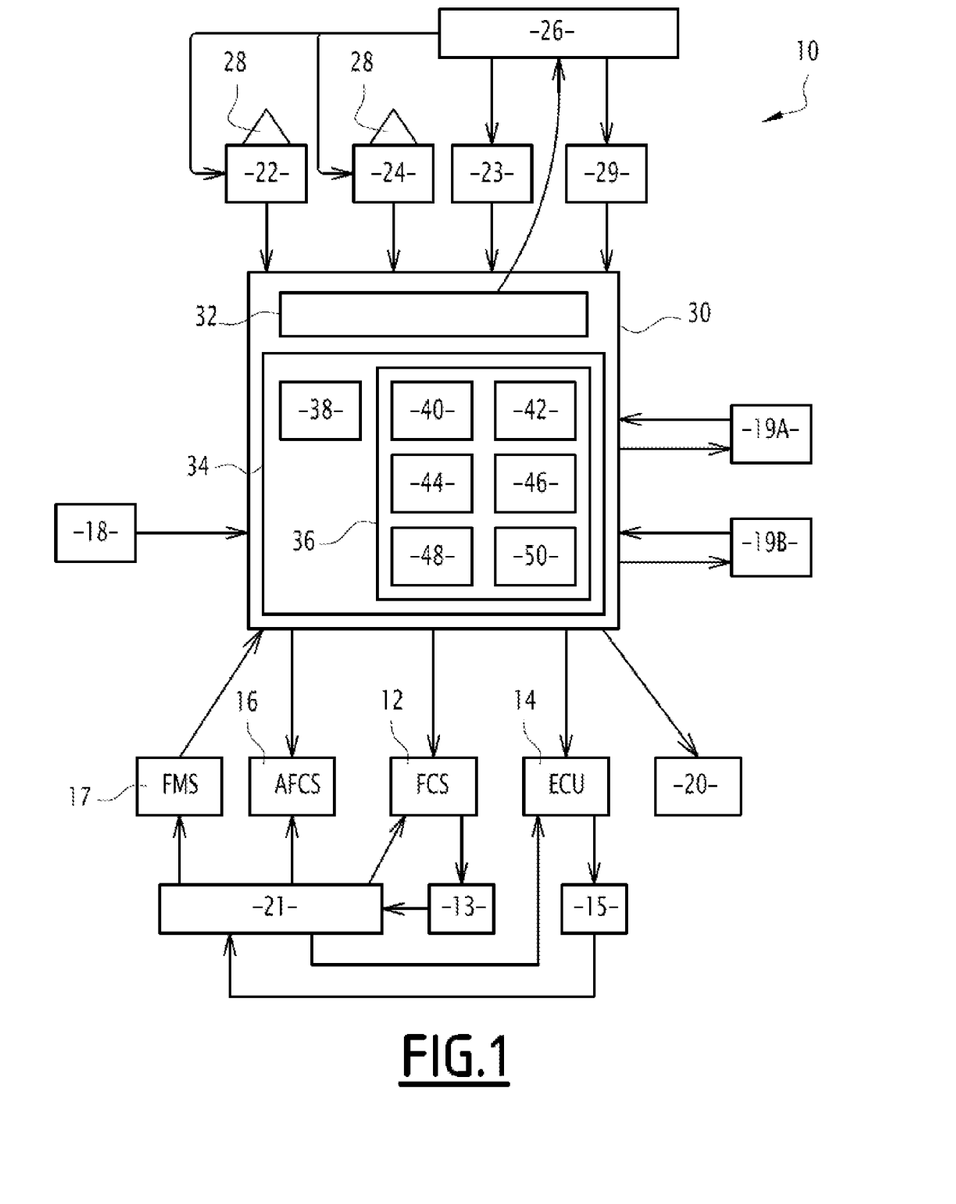

In FIG. 1, an aircraft 10, such as an airplane or a helicopter, comprises a flight control system (FCS) 12, also called fly by wire (FBW), to act on a set of control surfaces and actuators 13 of the aircraft. In the case of a fixed-wing aircraft, the control surfaces are for example ailerons, the elevator or the rudder. In the case of a rotary wing aircraft, the control surfaces are for example the attitude control system, the blade angle or the tail rotor pitch.

The aircraft 10 comprises an engine control unit (ECU) 14 in order to vary the energy delivered by an engine 15 of the aircraft, such as a jet engine, turboprop engine or turbine.

The aircraft 10 comprises at least one guidance system, such as an automatic pilot (AP) device 16, also called auto-flight control system (AFCS), such as a flight management system (FMS) 17 of the aircraft. Additionally, the guidance system is an auto-thrust device, not shown, also called automatic throttle.

The aircraft 10 comprises at least one external system 18 for generating a setpoint trajectory, and protection systems 19A, 19B of the aircraft, such as a traffic collision avoidance system (TCAS) 19A, a terrain awareness and warning system (TAWS) 19B, a weather radar, not shown, or a windshear detection system The protection systems 19A, 19B are generally adapted to protect the aircraft 10 from a risk of leaving the flight envelope and/or a conflict related to the environment (terrain, traffic, variation in flight conditions).

The aircraft 10 comprises one or several data display systems 20, such as a head-down display system and/or a head-up display (HUD) system. The head-down display system is for example a navigation display.

The aircraft 10 comprises a set of sensors 21 that measure properties associated with the aircraft 10, in particular properties associated with the set of control surfaces and actuators 13, and send the measured values of said properties to the flight control system 12, the engine control unit 14, the automatic pilot device 16 and/or the flight management system 17.

The aircraft 10 comprises one or several control sticks or mini control sticks 22, one or several rudder bars 23 and one or several throttles or mini-throttles 24, each forming a primary control member able to be manipulated by the crew 26 of the aircraft in order to pilot the aircraft. The mini-throttle 24 refers to a throttle with a return of force toward an equilibrium position. Hereinafter, the term "control stick"

will refer indifferently to a control stick or a mini control stick and the term "throttle" will indifferently refer to a throttle or mini-throttle.

Additionally, the aircraft 10 comprises an additional control member 28 making it possible to increment or decrement a setpoint, or to designate the value of that setpoint directly.

The aircraft 10 further includes secondary control members 29, such as a selector or rotary member of a control panel, a touch-sensitive key of a touchscreen, or a voice command system.

Figure 2:
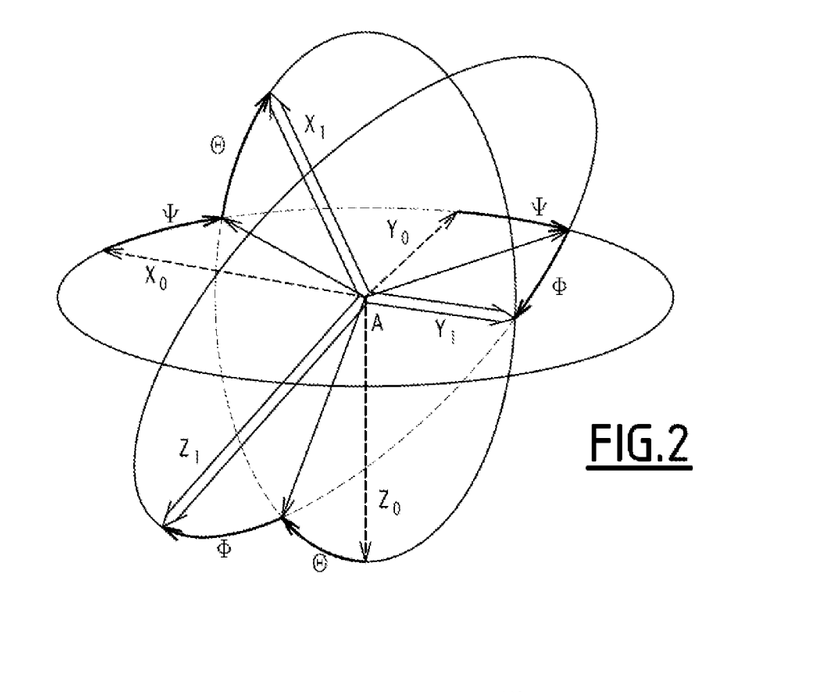
FIG. 2 is a diagrammatic illustration of the projections of the axes of an index related to the aircraft in a reference index.

According to the invention, the aircraft 10 comprises an electronic device 30 for generating a resulting setpoint trajectory of the aircraft intended for the guiding system 16, the resulting setpoint trajectory including at least one trajectory segment for at least one axis from among a lateral axis $y_1$, also called transverse axis, a vertical axis $z_1$ and a longitudinal axis $x_1$, associated with the aircraft and shown in FIG. 2.

Each trajectory segment is computed independently for each axis from among the lateral axis $y_1$, the vertical axis $z_1$ and the longitudinal axis $x_1$, or alternatively computed for a combination of several axes. As an example, a turn radius setpoint of the aircraft 10 is used to compute a trajectory segment for the lateral axis $y_1$, and an improved performance climb setpoint at a given airspeed is used to compute a trajectory segment combining the longitudinal $x_1$ and vertical $z_1$ axes.

The resulting setpoint trajectory is adapted to be sent to the guiding system 16, or as an optional addition to one or several protection systems 19A, 19B and to one or several display systems 20. The guiding system 16, the protection system(s) 19A, 19B and the display system(s) 20 then each form a receiving system suitable for receiving said resulting setpoint trajectory from the generating device 30. The guiding system 16 of the aircraft is configured to control the trajectory of the aircraft relative to said resulting setpoint trajectory. Each protection system 19A, 19B is configured to monitor the resulting setpoint trajectory and advantageously protect it, i.e., propose one or several avoidance trajectories if a danger is detected along the resulting setpoint trajectory. The display system 20 is configured to display the resulting setpoint trajectory.

The aircraft 10 moves relative to the ground according to a ground speed vector $V_s$ that forms, with the horizontal H, an angle $y_s$, called ground gradient of the aircraft, and moves relative to the air according to an air speed vector $V_a$, which forms an angle $y_a$ called air gradient of the aircraft with the horizontal H. The difference between the ground speed vector $V_s$ and the air speed vector $V_a$ corresponds to the wind speed vector $V_W$, which represents the movement of the air relative to the ground.

The flight control system 12 is known in itself, and makes it possible, via its action on all of the control surfaces and actuators 13, to cause a change in attitude of the aircraft 10.

The engine control unit 14 is known in itself, and makes it possible to cause a variation in the thrust of the engines 15 of the aircraft.

The automatic pilot device 16 and/or the auto-thrust device are known in themselves, and make it possible to act on the trajectory of the aircraft.

The flight management system 17 is known in itself and is suitable for managing a flight plan of the aircraft 10, from takeoff to landing.

Each setpoint trajectory generating system 18 is outside the generating device 30. Each external generating system 18 is further separate from the flight management system 17.

The external generating system 18 is for example a second flight management system of the aircraft, also denoted FMS2. Alternatively, the external generating system 18 is a system for acquiring a trajectory from an apparatus outside the aircraft 10, the setpoint trajectory for example coming from a datalink or an electronic tablet of the electronic flight bag (EFB) type.

The traffic collision avoidance system 19A is known in itself, and is suitable for monitoring the airspace around the aircraft 10, in particular in order to detect other aircraft equipped with a corresponding active transponder, or even providing one or several trajectory constraints or proposing one or several avoidance trajectories. This detection is independent of the air traffic control done by air traffic controllers.

The terrain awareness and warning system 19B is known in itself, and is suitable for combining flight data (position, speed) with a model of the terrain, or with measurements from a radioaltimeter, to compute the potential intersections of the trajectory of the aircraft with the ground, and if applicable, to generate alerts, or even to provide one or several trajectory constraints or propose one or several avoidance trajectories.

The sensors 21 are in particular able to provide information relative to the position of elements of the set of control surfaces and actuators 13, for example the position of the control surface, and/or relative to the status of the engines 15 and/or relative to high-lift configurations and/or relative to the deployed or retracted state of the landing gear.

The sensors 21 are further able to provide information relative to the position and dynamics of the aircraft, such as attitudes, accelerations, ground speed, route, altitude, latitude, longitude and/or relative to the environment of the aircraft 10, preferably relative to the atmosphere in which the aircraft 10 is moving, for example a pressure or a temperature.

Each control stick 22 is suitable for allowing a user to control the attitudes of the aircraft 10. Traditionally, each control stick 22 is a control lever that is suitable for being actuated in transverse movements, longitudinal movements, or any combination of transverse and longitudinal movements. In other words, each control stick 22 is movable in at least two different movement directions, the movement directions further being perpendicular to one another in the described example.

More specifically, each control stick 22 is suitable for allowing a user to control the roll angle through transverse movements of the control stick, and the pitch angle, also called pitch attitude, or the load factor through longitudinal movements of the control stick.

Each rudder bar 23 is known in itself, and is suitable for allowing a user to control the evolution of the yaw angle and the ground braking of the aircraft 10.

Each throttle 24 is suitable for creating a variation in the thrust or power of the engines 15 of the aircraft via the control system 14. Each throttle 24 is for example a control lever suitable for being actuated via longitudinal movements for a fixed-wing aircraft, and vertical movements for a rotary wing aircraft. In other words, each throttle 24 is movable along a movement direction, i.e., the longitudinal or vertical direction.

Figure 3:
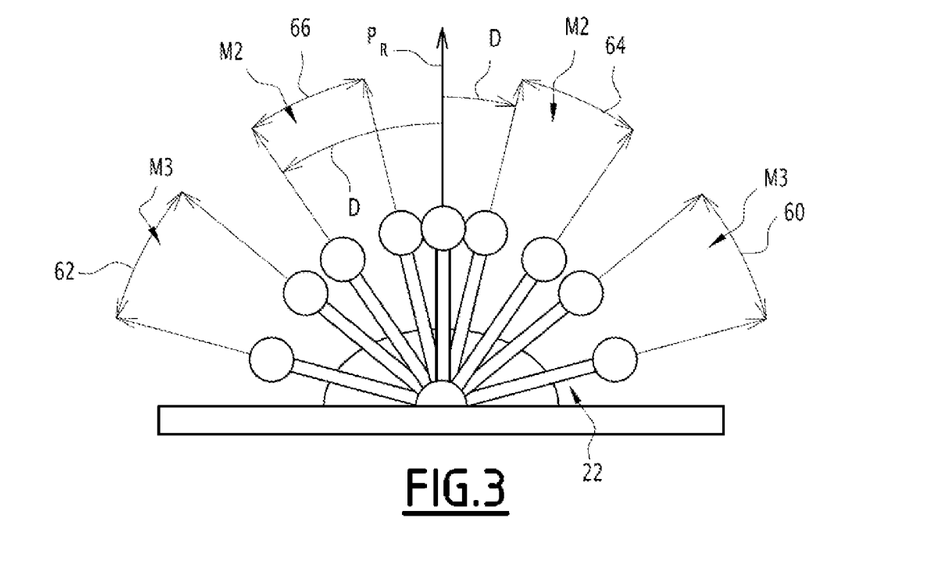
FIG. 3 is a diagrammatic illustration of a first range of values and a second range of values of a travel of the control stick of FIG. 1, the switchover to the third mode, the second mode, respectively, being done if the value of the property is in the first range, the second range, respectively.

Each primary member 22, 23, 24 includes an idle position for each movement direction, the idle position, also called neutral position, being the position of the primary member 22, 23, 24 when it is not manipulated, preferably corresponding to the median position between the extreme values of a travel D of the corresponding primary member 22, 23, 24 along the corresponding movement direction. In FIG. 3, the idle position is the position corresponding to the axis $P_R$.

Additionally, each control stick 22 and each throttle 24 is a controllable (i.e., steerable) mechanical force control lever, and a mechanical force feedback law defines the mechanical force supplied by each lever 22, 24 based on the travel D of each lever 22, 24 relative to its idle position. According to this edition, each control stick 22 and each throttle 24 and generally more specifically called mini-stick and mini-throttle.

Additionally, the mechanical force feedback law depends on other parameters, such as the state of the actuators or the guiding systems, for example.

Additionally, each control lever, forming each throttle 24 and/or each control stick 22, includes at least one predetermined reference position, the reference position(s) for example corresponding to position notches, not shown.

Additionally, the additional control member 28 is fastened to each control stick 22 and/or to each throttle 24. It is movable in at least one direction, in order to increment or decrement at least one corresponding setpoint. When the additional control member 28 is positioned on the throttle 24, the corresponding guiding setpoint is preferably an airspeed setpoint (CAS, TAS, MACH) or ground speed when taxiing. When the additional control member 28 is movable in two separate directions, it is suitable for incrementing or decrementing two separate guiding setpoints. When the additional control member 28 is positioned on the control stick 22, it is preferably movable in two separate perpendicular directions, one being longitudinal and the other being transverse. The guiding setpoint corresponding to the longitudinal movement of the additional control member 28 is then preferably the altitude, and the guiding setpoint corresponding to the transverse movement of the additional control member 28 is then preferably the heading or the route.

The additional control member 28 for example has a conical shape when it is movable in two separate directions, or a knob form when it is movable in a single direction. The additional control member 28 associated with each control stick 22 is preferably conical, and is also called A-frame, and that associated with each throttle 24 is preferably in the form of a knob.

"Attitudes" refer to the oriented angles between the predetermined axes of the aircraft, called aircraft axes, and their projection in reference planes. Among the attitudes, a distinction is made between the roll angle or angle of heel, the pitch angle or attitude, and the heading, known in themselves and recalled below in reference to FIG. 2.

The reference planes are determined from three reference axes.

The aircraft axes and the reference axes are concurrent at a predetermined point A of the aircraft 10, A for example being close to the center of gravity of the aircraft.

The reference axes are the axes of the local land referential and comprise a vertical reference axis $z_0$, a longitudinal reference axis $x_0$ and a lateral reference axis $y_0$, forming a direct orthonormal base ($x_0,y_0,z_0$) called "reference base".

The vertical reference axis $z_0$ is an axis oriented in the descending direction of the local gravitational field and passing through the predetermined point A of the aircraft. The longitudinal reference axis $x_0$ is an axis oriented in a predetermined direction, for example magnetic or geographical north, and orthogonal to the vertical reference axis $z_0$. The lateral reference axis $y_0$ completes $z_0$ and $x_0$ to form the "reference base".

The vertical $z_0$ and longitudinal $x_0$ reference axes form a vertical reference plane. The lateral $y_0$ and longitudinal $x_0$ reference axes form a horizontal reference plane.

The aircraft axes comprise the longitudinal aircraft axis $x_1$, the vertical aircraft axes $z_1$ and the lateral aircraft axis $y_1$, forming a direct orthonormal base ($x_1,y_1,z_1$) called "aircraft base".

The longitudinal aircraft axis $x_1$ is an axis oriented toward for the aircraft, passing through the predetermined point A and belonging to a plane of symmetry of the aircraft. The plane of symmetry of the aircraft is generally related to the geometric definition of the airframe of the aircraft, and for example involves the plane passing through the nose of the aircraft and the point A and orthogonal to the plane formed by the airfoil of the aircraft when idle. The lateral aircraft axis $y_1$ is the axes particular to the plane of symmetry and oriented toward the right of the aircraft, i.e., the right of an observer onboard the aircraft and looking toward the front of the aircraft. The vertical aircraft axis $z_1$ completes $y_1$ and $x_1$ to form the "aircraft base".

The angle $\Phi$ between the lateral aircraft axis $y_1$ and the horizontal reference plane is the roll angle. The angle $\theta$ between the longitudinal aircraft axis $x_1$ and the horizontal reference plane is the pitch angle. The angle $\psi$ between the longitudinal aircraft axis $x_1$ and the vertical reference plane is the heading. $\Phi$, $\theta$ and $\psi$ are generally called the Euler angles making it possible to go from the index of the aircraft to the reference index.

The generating device 30 comprises a display screen 32 and information processing unit 34 for example made up of a memory 36 and a processor 38 associated with the memory 36.

In the example of FIG. 1, the generating device 30 is separate from the flight control system 12, the engine control system 14, the automatic pilot device 16, the flight management system 17, the external generating system(s) 18 and the protection systems 19A, 19B.

In an alternative that is not shown, the generating device 30 is integrated into any one of the elements chosen from among the following elements: the flight control system 12, the engine control system 14, the automatic pilot device 16, the flight management system 17, the external generating system(s) 18 and the protection systems 19A, 19B. The display screen 32, and the information processing unit 34, respectively, then correspond to the display screen and the information processing unit, respectively, not shown, of said element. According to this alternative, the generating device 30 is preferably integrated into the flight control system 12.

The memory 36 is able to store a software program 40 for computing a setpoint trajectory based on at least one guiding setpoint or based on an acquired mechanical property relative to one of the primary control members 22, 23, 24, such as the travel D of said member or a mechanical force F applied against said member along the corresponding direction, each guiding setpoint being selected by the crew 26 via one of the control members 22, 23, 24, 28, 29 or developed from constraints from one of the protection systems 19A, 19B or acquired from the flight management system 17 or acquired from the external generating system(s) 18. The computing software 40 forms, when it is executed by the processor 38, a trajectory computing module for computing the setpoint trajectory, internal to the generating device 30.

The memory 36 is able to store a software program 42 for selecting at least one operating mode from among a plurality of operating modes, such as a first operating mode M1, a second operating mode M2, a third operating mode M3 and a fourth operating mode M4. These different operating modes M1, M2, M3, M4 will be described in more detail later.

The memory 36 is able to store a software program 44 for acquiring a setpoint trajectory prepared by the flight management system 17, the prepared setpoint trajectory including one or several trajectory segments for at least one axis among the lateral axis $y_1$, the vertical axis $z_1$ and the longitudinal axis $x_1$.

The memory 36 is able to store a software program 46 for obtaining an alternative setpoint trajectory from an element from among the trajectory computing module 40 and the external generating system(s) 18, the alternative setpoint trajectory including one or several trajectory segments for at least one axis among the lateral axis $y_1$, the vertical axis $z_1$ and the longitudinal axis $x_1$.

The memory 36 is able to store a software program 48 for generating the resulting setpoint trajectory, the resulting setpoint trajectory including the segment(s) of the prepared setpoint trajectory acquired for the period of time corresponding to the selection of the first operating mode M1, and the segment(s) of the alternative setpoint trajectory obtained for the period of time corresponding to the selection of another operating mode M2, M3, M4.

The memory 36 is further suitable for storing software 50 for displaying, on the screen 32, information to assist with piloting for the crew 26.

The processor 38 is able to load and run each of the software programs 40, 42, 44, 46, 48 and 50.

The selecting software 42, the acquiring software 44, the obtaining software 46, the generating software 48, and the display software 50 form means for selecting at least one operating mode M1, M2, M3, M4, means for acquiring the prepared setpoint trajectory, means for obtaining the alternative setpoint trajectory, means for generating the resulting setpoint trajectory and means for displaying piloting aid information, respectively.

Alternatively, the trajectory computing module 40, the selecting means 42, the acquiring means 44, the obtaining means 46, the generating means 48 and the display means 50 are made in the form of programmable logic components, or in the form of dedicated integrated circuits.

The trajectory computing module 40 is suitable for computing one or several setpoint trajectory segments based on at least one guiding setpoint or based on the mechanical property D, F relative to one of the primary control members 22, 23, 24.

For each setpoint trajectory segment, at least one aeronautic characteristic of the aircraft 10 is constant, each aeronautic characteristic being chosen from among the group consisting of: a turn radius, a route, a ground gradient, an altitude (absolute, barometric, relative to the terrain), a ground speed, a vertical speed, a roll angle, a pitch attitude, a heading, a load factor, a lateral acceleration, a roll rate, a pitch attitude rate of change, a gradient acceleration, a gradient acceleration rate of variation, a power level such as a specific engine rating, a performance level such as a better rate of climb, a rate of acceleration and an airspeed CAS (calibrated airspeed), TAS (true airspeed), MACH, a sideslip position and angle.

The gradient acceleration setpoint is a setpoint of an acceleration along the direction carried by a speed vector chosen from among the air speed vector $V_a$ and the ground speed vector $V_S$.

The setpoint trajectory segment for example includes a first reference waypoint or plane and a second reference waypoint or plane, the first reference waypoint or plane forming the beginning of the segment and the second reference waypoint forming the end of the segment.

Alternatively, the setpoint trajectory segment is defined by other beginning and ending conditions, these conditions for example depending on the outside environment of the aircraft 10 and the performance of the aircraft. As an example, the start condition for a trajectory segment containing a constant CAS speed setpoint of 250 knots, is crossing an altitude of 10,000 feet. As an additional example, the end condition of a trajectory segment containing a constant vertical speed setpoint is the optimal altitude capture condition for the setpoint trajectory segment following a constant altitude setpoint. The optimal altitude capture condition for example corresponds to an altitude detection done with a load factor not exceeding a predefined comfort threshold, such as a threshold equal to 0.05 g, and leading to a maneuver without exceeding the following trajectory segment. As is known in itself, an altitude capture is a transition from an altitude variation phase (ascent or descent) of the aircraft 10 to a phase for maintaining the altitude of the aircraft.

Optionally, one or several predefined waypoints are added to a corresponding trajectory segment, to better define said trajectory segment. These predefined waypoints then form intermediate waypoints between the beginning and the end of the corresponding trajectory segment.

As an example, in the case of a plateau-balanced rectilinear flight, the resulting setpoint trajectory includes three segments, one for each axis. The longitudinal segment is a maintaining of speed, for example a segment with a constant CAS, the vertical segment is a maintaining of altitude, for example a segment with a constant barometric altitude, and the lateral segment is a maintaining of heading, i.e., a segment with a constant heading.

As an additional example, to descend to a lower altitude, the resulting setpoint trajectory contains two vertical segments. The first vertical segment is defined by a descent at a specific engine rating, for example a minimum IDLE rating, and the second by the desired lower barometric altitude. The first segment is then sequenced, i.e., eliminated and replaced by the following segment, once the conditions for activation of the following segment are fulfilled, i.e., once the optimal altitude capture condition is fulfilled.

As an additional example, to change heading from the right, the resulting setpoint trajectory contains two lateral segments. The first, a turn from the right, is defined by a constant and positive roll (for example, 15° of roll), and the second is defined by the desired exit heading.

As an additional example, in the case of a strong action on the control stick 22 along the lateral axis, the lateral trajectory includes, in the first position, i.e., in the active position, a segment for maintaining the roll angle; the roll angle being computed from the travel of the control stick 22. The lateral trajectory then includes, in the second position, a constant roll segment, this roll setpoint for example being a prediction of the roll computed by the trajectory computing module 40. The first segment is for example sequenced when the control stick 22 returns to the neutral position along the lateral direction, i.e., when the lateral position of the control stick 22 no longer leads to computing a segment for maintaining the roll rate. Thus, an action on the control stick 22 defines a lateral trajectory segment.

In the case of computing setpoint trajectory segments based on the mechanical property D, F relative to one of the primary control members 22, 23, 24, the trajectory computing module 40 is suitable for reading a control signal issued by each of the primary control members 22, 23, 24, the control signal depending on the mechanical property D, F, then converting each control signal into a primary setpoint, such as a longitudinal acceleration setpoint, or a load factor setpoint, or a pitch attitude variation setpoint, or a roll rate setpoint, optionally furthermore from data coming from the sensors 21.

The trajectory computing module 40 is then suitable for computing, from the control signal converted into a primary setpoint, an estimate of the variation over time, from a computation date T to a prediction date T', of the property corresponding to the control signal. The trajectory computing module 40 is also able to compute the transform of the control signal via a predetermined transform. The purpose of such a transform is to provide a signal representative of an estimate on at least one date T* after the computation date T, such as dates before and after the prediction date T', of the future evolution of the control signal from the value of the control signal on at least one date before or equal to the computation date T.

For example, a filter is applied to the control signal.

For example, in the case of continuous signals, the filter is a linear filter with predetermined transfer function H.

For example, in the case of discrete signals, each sample of the transform of the control signal depends on one or more samples of the control signal and one or more preceding samples of the transform of the control signal.

Advantageously, the transfer function H is the transfer function of a filter having a positive phase in a predetermined frequency band. Advantageously, the transfer function filter H has a positive phase in the frequency band comprised between 0 Hz and 20 Hz, preferably comprised between 0 Hz and 10 Hz, still more preferably comprised between 0 Hz and 5 Hz.

The transfer function H is for example the transfer function of a high-pass filter.

For example, in the case of continuous signals, in the Laplace domain, a simple expression of a high-pass filter H is written:

$$H(p) = \frac{G}{1 + Kp} \quad (1)$$

where the coefficients G, K are the coefficients of the transfer function H and p represents the Laplace variable.

The value of all or some of the coefficients G, K of the transfer function H varies as a function of the data provided by the sensors 21. Different values authorized for the coefficients G, K are stored in the memory 36.

For example, to predict the roll rate or load factor, the transfer function H is written:

$$H(p) = \frac{1}{1 + p} \quad (2)$$

In the case of discrete signals, the relationship between the input and output samples of the filter is traditionally deduced from the preceding expressions of the transfer function H.

The trajectory computing module 40 is suitable for modifying the values of the coefficients G, K as a function of data provided by the sensors 21.

The trajectory computing module 40 is further suitable for computing an integral relative to the time of a signal depending on the control signal, and adjusting the value of the computed integral to the current value of the corresponding property.

As an optional addition, the trajectory computing module 40 is suitable for correcting the computed estimate, for example based on an estimate computed for another aircraft axis. Such a correction in particular reflects the variations over time of the angles between the aircraft axes and the reference axes, and therefore the variation over time of the projection of the speed vectors of the aircraft in the reference base. Such a correction also reflects the variation over time of the speed modules of the aircraft 10. For example, such a correction accounts for the relationship between the vertical speed and the gradient, and the relationship between the vertical speed and the ground speed. Such a correction also for example reflects the relationship between the roll angle, the ground speed and a turning radius, the turning radius being a notion known by those skilled in the art.

The trajectory computing module 40 is also suitable for correcting the computed estimate in case of variation of the value measured by one or more predetermined sensors 21.

The computed estimate is then for example used to define a trajectory segment, such as a trajectory segment with constant roll, and/or with acceleration on a constant gradient, and/or with a constant pitch attitude, and/or with a constant vertical speed or gradient. The estimate is for example also used to display the resulting setpoint trajectory.

Each guiding setpoint is chosen from among the group consisting of: a turn radius setpoint, a route setpoint, a ground gradient setpoint, an altitude setpoint (barometric, absolute, relative to the ground), a ground speed setpoint, a vertical speed setpoint, a roll angle setpoint, a pitch attitude setpoint, a heading setpoint, a load factor setpoint, a lateral acceleration setpoint, a roll rate setpoint, a pitch attitude rate of change setpoint, a gradient acceleration setpoint, a gradient acceleration rate of variation setpoint, a power level setpoint, a performance level setpoint, a ground trajectory setpoint associated with a waypoint, a relative airspeed setpoint (CAS, TAS, MACH), a side-slip angle setpoint and a position setpoint.

Each guiding setpoint is then developed from at least one constraint from one of the protection systems 19A, 19B, or selected by the crew 26 via one of the control members 22, 23, 24, 28, 29, or acquired from the flight management system 17 or acquired from the external generating system(s) 18.

When the guiding setpoint is developed from constraints from one of the protection systems 19A, 19B, the guiding setpoint is also called protection setpoint. Among the aforementioned guiding setpoints, any guiding setpoint can be developed from constraints from one of the protection systems 19A, 19B.

When the guiding setpoint is selected by the crew 26 via the manipulation of at least one corresponding primary control member 22, 23, 24, and additionally further as a function of the manipulation of the additional control member 28, the trajectory computing module 40 is suitable for computing each guiding setpoint based on the corresponding manipulation. The guiding setpoint selected by the crew 26 is preferably chosen from among the group consisting of: a turn radius setpoint, a route setpoint, a ground gradient setpoint, an altitude setpoint, a ground speed setpoint, a vertical speed setpoint, a roll angle setpoint, a pitch attitude setpoint, a heading setpoint, a lateral acceleration setpoint, a gradient acceleration setpoint, a power level setpoint, a performance level setpoint, a ground trajectory setpoint associated with a waypoint, a relative airspeed setpoint (CAS, TAS, MACH), a side-slip angle setpoint and a position setpoint.

The trajectory computing module 40 is for example suitable for computing a vertical speed setpoint Vzc, or a gradient setpoint, as a function of a manipulation of the control stick 22 in its longitudinal direction. The vertical speed setpoint Vzc, or the gradient setpoint, is associated with the vertical aircraft axis $z_1$.

The trajectory computing module 40 is for example suitable for computing a roll setpoint $\varphi_c$, or a turn radius setpoint $R_c$ of the aircraft, as a function of a manipulation of the control stick 22 in its transverse direction. The roll setpoint $\varphi_c$, or the turn radius setpoint $R_c$, is associated with the lateral aircraft axis $y_1$.

The trajectory computation module 40 is for example able to convert a longitudinal transverse travel acquired from the control stick 22 into a control parameter, according to traditional conversion law The trajectory computation module 40 is then able to develop the vertical speed setpoint $\varphi_c$ or the turn radius setpoint $R_c$, as a function of the position of the aircraft 10 and the control parameter resulting from the previous conversion.

As an example, in the case of the vertical aircraft axis $z_1$, the vertical speed setpoint Vzc at moment $T_1$ is computed by integrating, between two moments $T_0$ and $T_1$, the control parameter resulting from the prior conversion of the acquired longitudinal travel, then adding that integral to the vertical speed setpoint Vzc at moment $T_0$.

Advantageously, the gradient setpoint, also called flight path angle (FPA), is computed based on the vertical speed setpoint Vzc by means of an estimate of the ground speed Vsol measured using the sensors 21 of the aircraft using the following equation, verified by the FPA gradient:

$$FPA = \arctan\left(\frac{Vzc}{Vsol}\right) \quad (3)$$

Alternatively, the gradient setpoint is computed first, then the vertical speed setpoint Vcz.

As an example, in the case of the lateral aircraft axis $y_1$, the roll setpoint $\varphi_c$ at moment $T_1$ is computed by integrating, between two moments $T_0$ and $T_1$, the control parameter resulting from the prior conversion of the acquired transverse travel, then adding that integral to the roll setpoint $\varphi_c$ at moment $T_0$.

Advantageously, the ground turn radius setpoint $R_c$ is computed based on the roll setpoint $\varphi_c$ previously developed, by means of an estimate of the ground speed Vsol measured via the sensors 21 of the aircraft using the following equation:

$$R_c = \frac{V_{sol}^2}{\tan(\varphi_c) \times g} \quad (4)$$

Alternatively, the ground turn radius setpoint $R_c$ is computed first, then the roll setpoint $\varphi_c$.

The trajectory computing module 40 is for example able to convert a travel of the throttle(s) 24 into an engine control parameter, according to a traditional conversion law.

The trajectory computing module 40 is then able to develop a longitudinal velocity setpoint, as a function of the manipulation of the throttle(s) 24. The longitudinal velocity setpoint is associated with the longitudinal aircraft axis $x_1$.

As an example, the control parameter is then converted into a gradient acceleration setpoint via predefined tables depending on the aircraft and its considered configuration. The longitudinal velocity setpoint at moment $T_1$ is then computed by integrating the gradient acceleration setpoint between two moments $T_0$ and $T_1$, then adding that integral to the value of the longitudinal setpoint at moment $T_0$.

When the guiding setpoint is selected by the crew 26 via the manipulation of at least one corresponding secondary control member 29, such as the control panel selector, the touchscreen, or the voice control system, the trajectory computing module 40 is suitable for reading the value of the guiding setpoint, this guiding setpoint value then being directly entered using the secondary control member 29, and not needing to be converted by the trajectory computing module as previously described in the case of the manipulation of at least one primary control member 22, 23, 24 to select that guiding setpoint.

The trajectory computing module 40 is generally suitable for computing the setpoint trajectory segments based on at least one guiding setpoint, each guiding setpoint being taken into account to compute a trajectory segment being constant for the period of time corresponding to the segment. In the example previously described, a first segment is computed with a constant roll rate, then a second segment is computed with a constant roll rate.

The selecting software 42 is suitable for selecting one or several operating modes from among the first, second, third and fourth operating modes M1, M2, M3, M4.

According to a first embodiment, each operating mode M1, M2, M3, M4 can be selected independently for each axis from among the lateral axis $y_1$, the vertical axis $z_1$ and the longitudinal axis $x_1$, and selecting the operating mode(s) will now be described for any one of the axes among the lateral axis $y_1$, the vertical axis $z_1$ and the longitudinal axis $x_1$, with the understanding that the selecting method is identical from one axis to another.

The first mode M1 is the default mode, also called FLIGHT PLAN mode, and corresponds to the operation where the resulting setpoint trajectory is the prepared setpoint trajectory received from the flight management system 17. The second mode M2 corresponding to the guiding setpoints is also called VECTOR mode. The third mode M3 corresponding to the primary setpoints is also called MANUAL mode.

The selecting software 42 is suitable for acquiring the mechanical property D, F relative to one of the primary control members 22, 23, 24 and for selecting the corresponding operating mode based on the mechanical property D, F acquired for the primary control member 22, 23, 24 associated with the considered axis from among the lateral axis $y_1$, the vertical axis $z_1$ and the longitudinal axis $x_1$.

Figure 4:
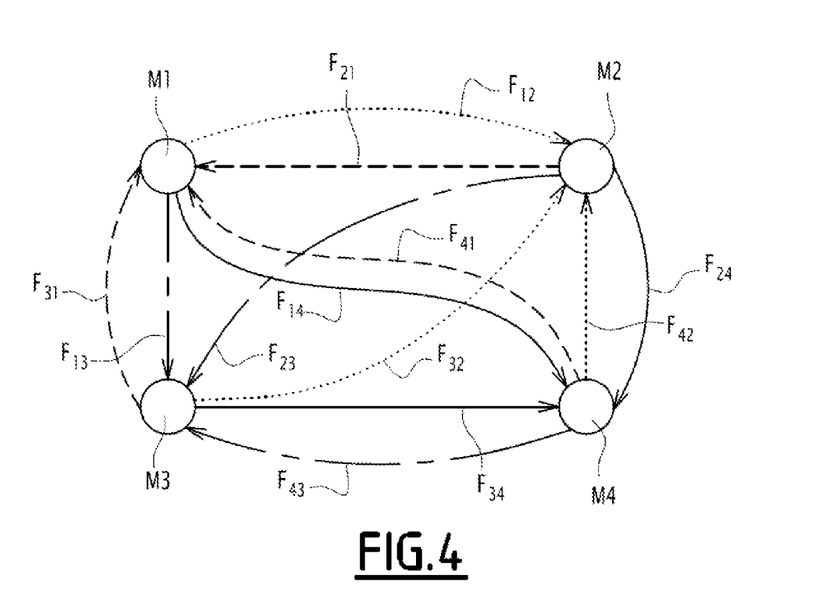
FIG. 4 is a diagrammatic illustration of relations between the different operating modes.

The selecting software 42 is suitable for selecting the first operating mode M1, or switching over from another operating mode M2, M3, M4 to the first operating mode M1, as shown by arrows $F_{21}$, $F_{31}$, $F_{41}$ in dotted lines in FIG. 4, only when the primary control member 22, 23, 24 associated with the considered axis from among the lateral axis $y_1$, the vertical axis $z_1$ and the longitudinal axis $x_1$ is in its idle position, also called neutral position.

Alternatively or additionally, the selecting software 42 is suitable for selecting the operating mode, in particular the fourth operating mode M4, as shown by arrows $F_{14}$, $F_{24}$, $F_{34}$ in solid lines in FIG. 4, following the acquisition of the actuation of the specific button, such as the control panel selector or the touch-sensitive key forming the secondary control member 29, or such as the additional control member 28.

The selecting software 42 is preferably suitable for switching over to the third mode M3, as shown by arrows $F_{13}$, $F_{23}$, $F_{43}$ in broken lines in FIG. 4, when the value of the acquired mechanical property corresponding to the considered aircraft axis, such as the travel D or the applied force F, belongs to a first value range. The selecting software 42 is preferably suitable for switching over to the second mode M2, as shown by arrows $F_{12}$, $F_{32}$, $F_{42}$ in dotted lines in FIG. 4, when the value of the corresponding acquired mechanical property belongs to a second value range, the second range being different from the first range. The values of the second range are preferably lower in absolute value than those of the first range, using as convention that the zero value corresponds to the neutral position of the corresponding primary member 22, 23, 24.

The second range is preferably separate from the first range, so as to allow the establishment of a hysteresis, to avoid parasitic switchovers, or switchovers not desired by the user, between the second mode M2 and the third mode M3.

In the example of FIG. 3, the mechanical property taken into account by the selecting software 42 is the position of the control stick 22. The first value range is in the form of a first interval 60 and a second interval 62, the first and second intervals 60, 62 preferably being separate and substantially symmetrical relative to the axis $P_R$ corresponding to the neutral position of the control stick 22. Similarly, the second value range is in the form of a third interval 64 and a fourth interval 66, the third and fourth intervals 64, 66 preferably being separate and substantially symmetrical relative to the axis $P_R$ associated with the neutral position of the control stick 22.

In FIG. 3, the first and second intervals 60, 62 correspond to positions of the control stick 22 further away from the neutral position than the positions associated with the third and fourth intervals 64, 66. In other words, by measuring the position of the control stick 22 in the form of an angular deviation, or the travel D, between said position and its neutral position, the values of the second range associated with the position of the control stick 22 are smaller in terms of absolute value than those of the first range associated with the position of the control stick 22, with the zero value corresponding to the neutral position of the control stick 22. In FIG. 3, the control stick 22 is shown in different positions, in particular in its neutral position, with a value of the travel D varying from one position to the next.

In an alternative that is not shown, the mechanical property taken into account by the selecting software 42 is the mechanical force applied against the control stick 22 in the corresponding direction.

When the control stick 22 is a control stick with a linear force feedback, the movement of the control stick 22 in the corresponding direction is a linear function of the force F applied by the user against the control stick 22.

When the control stick 22 is a control stick with controllable force feedback, the movement of the control stick 22 is for example a nonlinear function of the force F applied by the user against the control stick 22.

In the described example, the aircraft 10 includes several primary control members 22, 23, 24, and the selecting software 42 is then suitable for acquiring mechanical properties relative to the plurality of primary control members 22, 23, 24. The selecting software 42 is then preferably suitable for switching between the second mode M2 and the third mode M3, for each primary control member 22, 23, 24 as a function of the mechanical property acquired for the corresponding primary control member.

In the described example, the control stick 22 is movable in at least two different movement directions, i.e., the longitudinal direction and the transverse direction, and the selecting software 42 is then preferably suitable for switching between the second mode M2 and the third mode M3, for each movement direction of the control stick 22 and as a function of the mechanical property acquired for said control stick 22 in the corresponding movement direction.

Additionally, the selecting software 42 is further suitable for allowing the switching from the third mode M3 to the second mode M2 only if the value of at least one aeronautic property from among measurements or estimates of a status vector of the aircraft 10, the first and second drifts of said measurements or estimates of the status vector, the airspeed of the aircraft 10, the sideslip of the aircraft 10 and the incidence of the aircraft 10, is comprised in a corresponding predetermined value range. The status vector of the aircraft 10 is made up of positions and attitudes of the aircraft 10.

According to a second embodiment, selecting one or several operating modes is coupled between at least two axes among the lateral $y_1$, vertical $z_1$ and longitudinal $x_1$ axes, i.e., the selection of the operating mode is shared for the coupled axes. The selection of the modes will be described in more detail below in light of FIG. 7. It is also specified that FIG. 7 relates to both the first and second embodiments.

Figure 7:
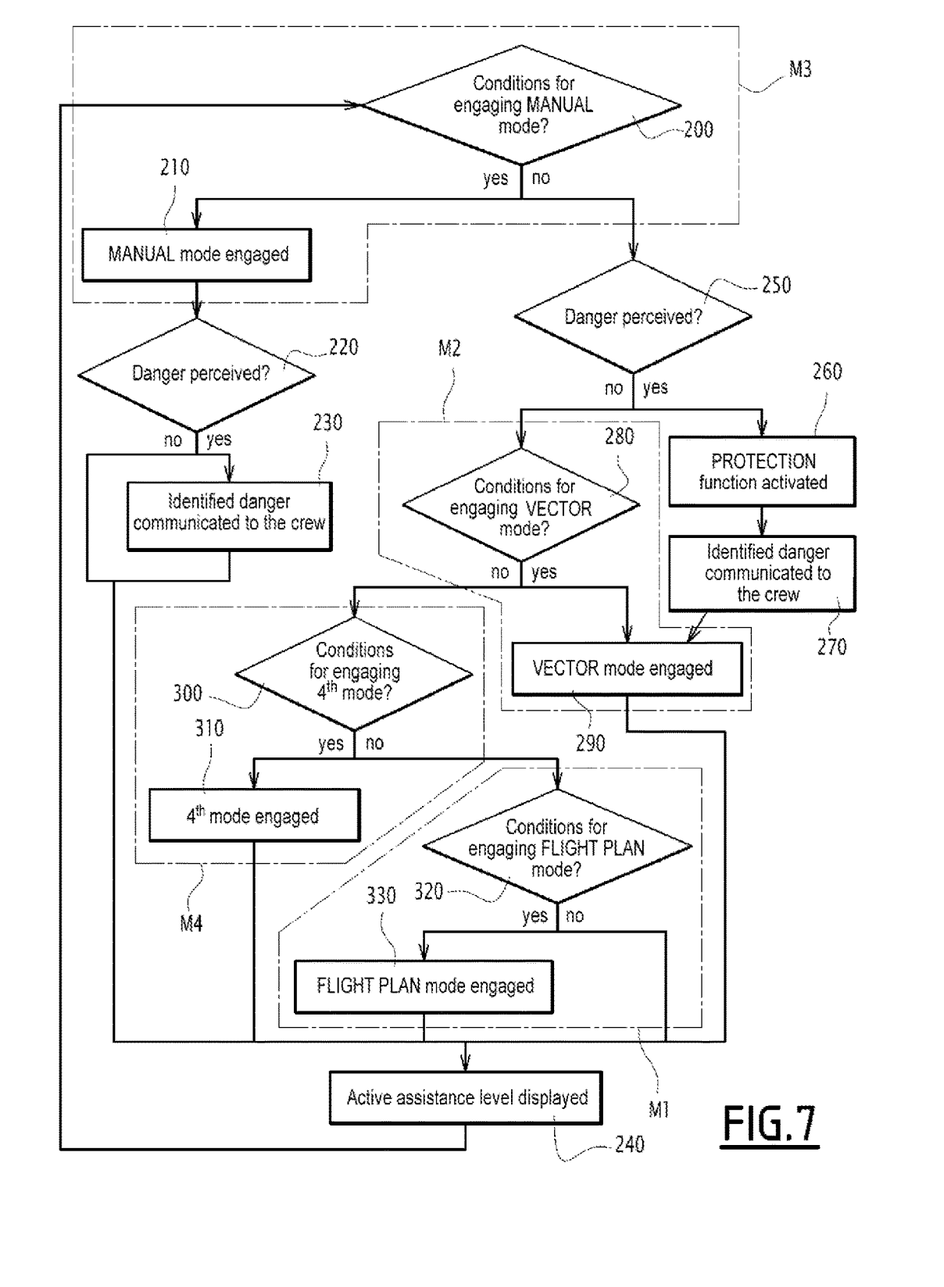
FIG. 7 is a logic diagram showing the transitions between the different operating modes.

The conditions for switchovers between the operating modes M1, M2, M3, M4 will also be described in more detail in light of FIG. 7 for the first and second embodiments.

The acquiring software 44 is suitable for acquiring the setpoint trajectory prepared by the flight management system 17, the prepared setpoint trajectory including one or several trajectory segments for at least one axis among the lateral axis $y_1$, the vertical axis $z_1$ and the longitudinal axis $x_1$. In other words, the acquiring software 44 is suitable for receiving said prepared setpoint trajectory from the flight management system 17.

As an optional addition, the acquiring software 44 is executed by the processor 38 to acquire said prepared setpoint trajectory only when the first operating mode M1 is selected.

The obtaining software 46 is suitable for obtaining the alternative setpoint trajectory, this alternative setpoint trajectory coming from the trajectory computing module 40 or a corresponding external generating system 18, and including one or several trajectory segments for at least one axis among the lateral axis $y_1$, the vertical axis $z_1$ and the longitudinal axis $x_1$. In other words, the obtaining software 46 is suitable for receiving said alternative setpoint trajectory from the trajectory computing module 40 or one of the external generating systems 18.

As an optional addition, the obtaining software 46 is executed by the processor 38 to obtain said alternative setpoint trajectory only when one of the second, third and fourth operating modes M2, M3, M4 is selected.

According to the described example, when the other selected operating mode is the second operating mode M2, the obtaining software 46 is suitable for obtaining the trajectory computed by the trajectory computing module 40 based on at least one guiding setpoint, said trajectory computed based on the guiding setpoint then forming the alternative setpoint trajectory used to compute the resulting setpoint trajectory for the period of time corresponding to the selection of the second operating mode M2.

In the described example, when the other selected operating mode is the third operating mode M3, the obtaining software 46 is suitable for obtaining the trajectory computed by the trajectory computing module 40 based on the mechanical property D, F relative to the corresponding primary control member 22, 23, 24, said trajectory computed based on the mechanical property D, F then forming the alternative setpoint trajectory used to compute the resulting setpoint trajectory for the period of time corresponding to the selection of the third operating mode M3.

According to the described example, when the other selected operating mode is the fourth operating mode M4, the obtaining software 46 is suitable for obtaining the setpoint trajectory received from the corresponding external generating system 18, said received setpoint trajectory then forming the alternative setpoint trajectory used to compute the resulting setpoint trajectory for the period of time corresponding to the selection of the fourth operating mode M4.

The generating software 48 is suitable for generating the resulting setpoint trajectory based on the selected operating mode, the resulting setpoint trajectory including the segment(s) of the prepared setpoint trajectory acquired for the period of time corresponding to the selection of the first operating mode M1, and the segment(s) of the alternative setpoint trajectory obtained for the period of time corresponding to the selection of another operating mode, i.e., the selection of any of the second, third and fourth operating modes M2, M3, M4 in the described example.

When several operating modes are selected, the operating mode other than the first operating mode M1 takes priority relative to the first operating mode M1, and the generating software 48 is then suitable for computing the resulting setpoint trajectory from the segment(s) of the alternative setpoint trajectory obtained for the period of time corresponding to the selection of these multiple operating modes. In other words, each of the second, third and fourth operating modes M2, M3, M4 takes priority relative to the first operating mode M1.

In particular, in the described example, the third operating mode M3 takes priority over the second operating mode M2, which in turn takes priority over the fourth operating mode M4.

Advantageously, the relative priorities between the first mode M1 and the fourth mode M4 depend on the external generating system 18 at the origin of the provided setpoint trajectory. As an example when the external generating system 18 is an electronic tablet of the electronic flight bag (EFB) type, priority is given to the first mode M1. As an additional example, when the external generating system 18 is a datalink system, priority is given to the fourth mode M4.

Figure 5:
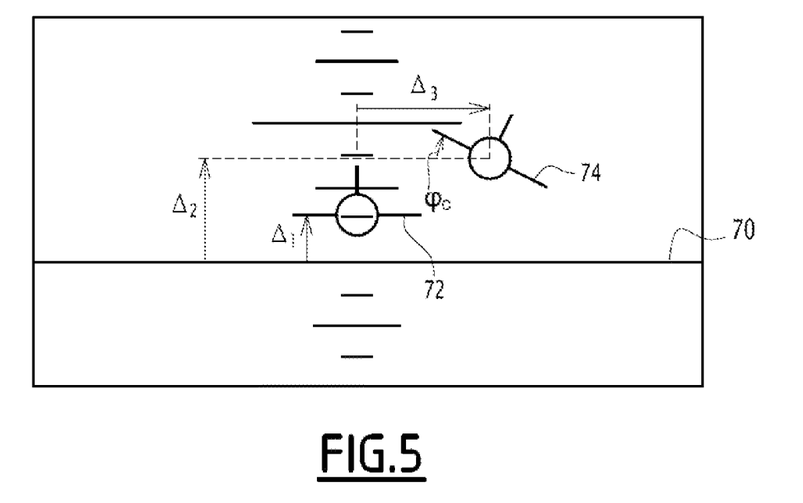
FIG. 5 is a diagrammatic illustration of information displayed on a screen of the generating device of FIG. 1.

The display software 50 is suitable for displaying, on the screen 32 and for the crew 26, piloting information, such as an artificial horizon line 70, a speed vector symbol 72 and a speed vector setpoint symbol 74, as shown in FIG. 5. The speed vector symbol 72 indicates the current direction of the ground speed vector $V_S$ of the aircraft 10. The speed vector setpoint symbol 74 indicates a speed vector setpoint controlled by the user, in particular using the control stick 22. The ordinate algebraic deviation $\Delta_1$ between the horizon line 70 and the speed vector symbol 72 represents the ground gradient $y_S$ of the aircraft. The ordinate algebraic deviation $\Delta_2$ between the horizon line 70 and the speed vector setpoint symbol 74 represents the gradient setpoint. The abscissa algebraic deviation $\Delta_3$ between the speed vector symbol 72 and the speed vector setpoint symbol 74 represents the deviation between the current route setpoint and the current route of the aircraft, the lateral position of the speed vector setpoint symbol 74 representing the route setpoint. The algebraic angle $\varphi_c$ between the horizon line 70 and the speed vector setpoint symbol 74 represents the roll setpoint.

Figure 6:
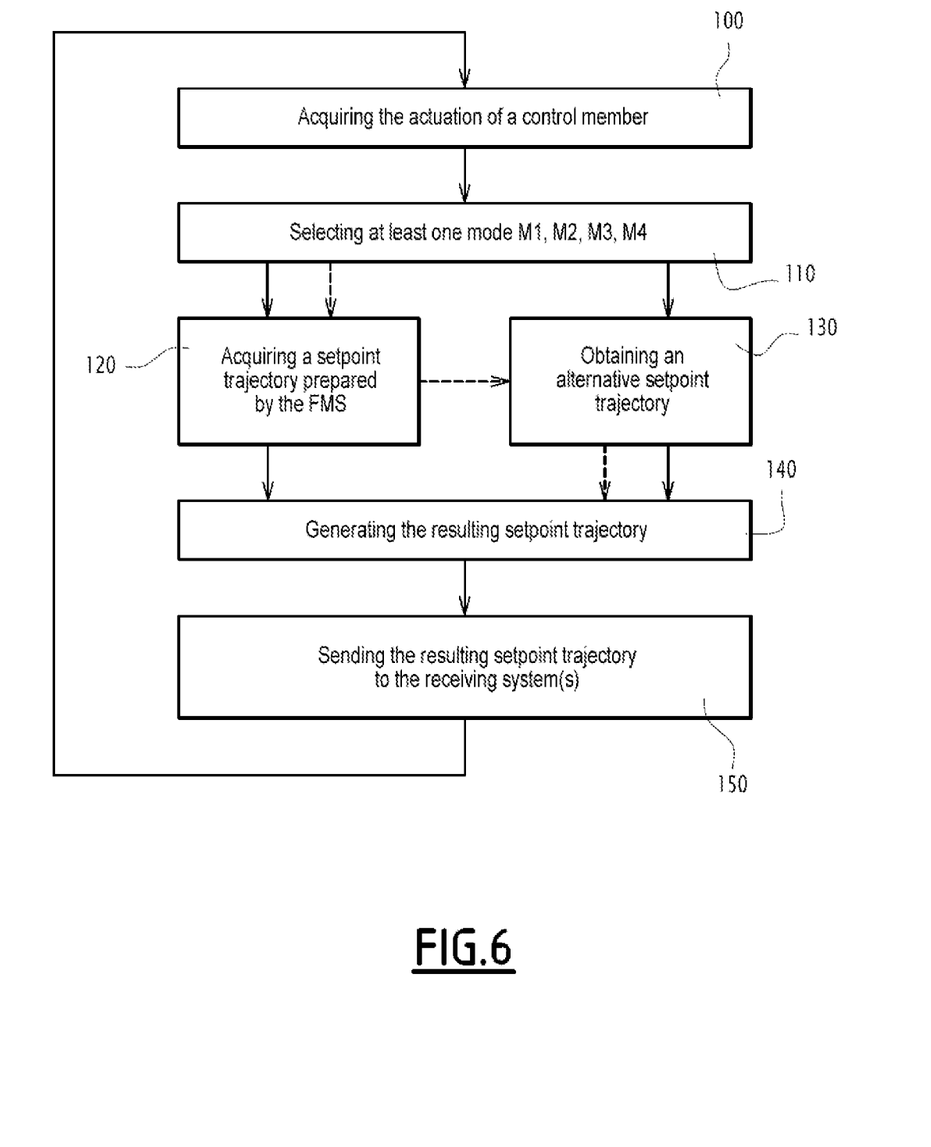
FIG. 6 is a flowchart of a method according to the invention for generating the resulting setpoint trajectory of the aircraft.

The operation of the generating device 30 according to the invention will now be described using FIG. 6, showing a flowchart of the method according to the invention for generating the resulting setpoint trajectory.

During an initial step 100, the generating device 30 begins by using its selecting software 42 to acquire the actuation of at least one control member from among the primary control members 22, 23, 24, the additional control member(s) 28 and the secondary control member(s) 29. Actuation refers to any action by the crew 26 on one of these control members 22, 23, 24, 28, 29, such as the manipulation of one of the primary control members 22, 23, 24 or one of the additional control members 28, or such as pressing on the control panel selector or the touch-sensitive key, or such as a voice command from the crew 26 to the voice control system.

Based on the actuation acquired during step 100 and as an optional addition based on other criteria that will be described in detail in light of FIG. 7, the generating device 30 next selects, during step 110 and using its selecting software 42, one or several operating modes from among the first, second, third and fourth operating modes M1, M2, M3, M4.

According to the first embodiment, each operating mode M1, M2, M3, M4 can be selected independently for each axis from among the lateral axis $y_1$, the vertical axis $z_1$ and the longitudinal axis $x_1$.

According to the second embodiment, the selection of one or several operating modes is coupled between at least two axes among the lateral $y_1$, vertical $z_1$ and longitudinal $x_1$ axes.

As previously described, the selection of the operating mode(s) M1, M2, M3, M4 is done based on the acquired mechanical property, such as the travel D or the applied force F, for the primary control member 22, 23, 24 associated with the considered axis from among the lateral axis $y_1$, the vertical axis $z_1$ and the longitudinal axis $x_1$.

In particular, when the value of the acquired mechanical property D, F for the primary control member 22, 23, 24 associated with the considered aircraft axis is not zero, then the selection of the operating mode is done only among the second operating mode M2 and the third operating mode M3. In other words, when the primary control member 22, 23, 24 associated with the considered axis is manipulated by the crew 26, the only operating modes selectable for said axis are the second and third operating modes M2, M3.

The switchover to the first operating mode M1 is done only when the primary control member 22, 23, 24 associated with the considered aircraft axis is in the neutral position.

When the first operating mode M1 is selected, the generating device 30 goes on to the following step 120, during which the setpoint trajectory prepared by the flight management system 17 is acquired by the acquiring software 44.

When the other operating mode from among the second, third and fourth operating modes M2, M3, M4 is selected, the generating device 30 goes directly from step 110 to step 130, during which the alternative setpoint trajectory is obtained, the alternative setpoint trajectory coming from the trajectory computing module 40 inside the generating device 30 or from one of the external generating systems 18.

Alternatively, as shown by the path in dotted lines in FIG. 6, the acquiring 120 and obtaining 130 steps are, at the end of step 110, performed successively irrespective of the selected operating mode(s).

At the end of the acquiring step 120 or the obtaining step 130, the generating device 30 generates, during step 140 and using the generating software 48, the resulting setpoint trajectory based on the selected operating mode, the resulting setpoint trajectory including the segment(s) of the prepared setpoint trajectory acquired for the period of time corresponding to the selection of the first operating mode M1, and the segment(s) of the alternative setpoint trajectory for the period of time corresponding to the selection of the other operating mode from among the second, third and fourth operating modes M2, M3, M4.

One skilled in the art will note that when several operating modes are selected, the other operating mode M2, M3, M4 takes priority relative to the first operating mode M1, and the resulting setpoint trajectory is then formed by the segment(s) of the alternative setpoint trajectory for the period of time corresponding to the selection of these multiple operating modes.

In particular, when several operating modes are selected from among the second, third and fourth modes M2, M3, M4, the third mode M3 takes priority over the second mode M2, which in turn takes priority over the fourth mode M4. The resulting setpoint trajectory is then formed, for the period of time corresponding to the selection of these multiple modes, from among the second, third and fourth modes M2, M3, M4, by the alternative setpoint trajectory that is obtained for the highest priority mode from among the multiple selected modes.

When the second operating mode M2 is selected, the alternative setpoint trajectory is a trajectory computed by the trajectory computing module 40 based on at least one guiding setpoint, as previously described.

When the third operating mode M3 is selected, the alternative setpoint trajectory is a trajectory computed by the trajectory computing module 40 based on the mechanical property D, F acquired for one of the primary control members 22, 23, 24 corresponding to the considered aircraft axis from among the lateral axis $y_1$, the vertical axis $z_1$ and the longitudinal axis When the fourth operating mode M4 is selected, the alternative setpoint trajectory is the setpoint trajectory received from the corresponding external generating system 18.

During step 150 and using the generating software 48, the generating device 30 next sends the resulting setpoint trajectory generated during step 140 to the receiving system(s) 16, 19A, 19B, 20 for the control of the trajectory of the aircraft 10 relative to said resulting setpoint trajectory by the guiding system 16, or for the surveillance and/or protection of the trajectory of the aircraft by one of the protection systems 19A, 19B, and as an optional addition, the display of the trajectory of the aircraft 10 by one of the display systems 20.

Additionally during step 150, the piloting aid information is displayed on the screen 32 by the display software 50, as shown in FIG. 5.

At the end of step 150, the generating device 30 returns to step 100, in order to acquire a new actuation of a control member 22, 23, 24, 28, 29.

The transitions between the different operating modes M1, M2, M3, M4 will now be described in more detail in light of FIG. 7, showing a logic diagram of these transitions.

During step 200, the selecting software 42 verifies whether the conditions for engaging the third mode M3, also called MANUAL mode, are met. The conditions for engaging the third mode M3 for example consist of the value of the acquired mechanical property D, F for the primary control member 22, 23, 24 corresponding to the considered aircraft axis or one of the coupled aircraft axes being comprised in the first interval 60 or the second interval 62, visible in FIG. 3.

According to the first embodiment, when the conditions for engaging the third mode M3 are met for the considered aircraft axis, then the third mode M3 is engaged during step 210 for only the considered aircraft axis.

According to the second embodiment, when the conditions for engaging the third mode M3 are met for one of the coupled axes of the aircraft, then the third mode M3 is engaged during step 210 for all of the coupled axes of the aircraft.

At the end of step 210, after the third mode M3 has been engaged, when the generating device 30 detects a danger during step 220, in particular using protection systems 19A, 19B or sensors 21, a function for communicating the danger of the aircraft 10 is activated (step 230), and the identified danger is communicated to the crew 26, for example on the screen 32 via the display software 50.

The type of danger identified has several possible causes, the main causes being the following:
- a traffic-related conflict that may require an avoidance maneuver,
- a conflict between the current trajectory of the aircraft 10 and the terrain;
- a weather-related threat, essentially local phenomena, such as a wind gradient, clear sky turbulence or wake turbulence, the detection of which is done on board the aircraft 10, for example via a radar or lidar. Weather-related phenomena of greater amplitude, such as storms, are generally known upstream and then integrated into the trajectory computation.

At the end of step 230, the selected mode, also called active assistance level, is displayed during step 240 on the screen 32 by the display software 50. In this case, the third mode M3 is selected, and the displayed active assistance level is then the MANUAL mode.

Alternatively, the display does not differentiate the MANUAL and VECTOR assistance levels, the level displayed in MANUAL mode then being the VECTOR level. In this alternative, the switchover between the MANUAL mode and the VECTOR mode is transparent to the crew, i.e., the crew is not aware of it.

The display of the active assistance level is done optionally, and step 240 is then optional. When step 240 is not done, the method returns directly to step 200.

If, during step 200, the conditions for engaging the third mode M3 are not met, then the generating device 30 goes to step 250, which is identical to the danger detection step 220 previously described.

If a danger is detected during step 250, then the generating device goes to step 260, during which the protection function of the aircraft 10 is activated.

It next generates guiding setpoints called "protection setpoints" intended for the VECTOR in order to avoid the identified dangers.

At the end of step 260, the generating device 30 goes to step 270, during which the identified danger is communicated to the crew 26, for example via the screen 32 using the display software 50.

At the end of step 270, the generating device 30 goes to step 290, which will be described below.

If no danger is detected during step 250, the selecting software 42 verifies during step 280 whether the conditions for engaging the second mode M2, also called VECTOR mode, are met.

According to the first embodiment, when the conditions for engaging the second mode M2 are met for the considered aircraft axis when one of the following conditions is true:
- the value of the acquired mechanical property D, F for the primary control member 22, 23, 24 corresponding to the considered aircraft axis is comprised in the third interval 64 or the fourth interval 66, visible in FIG. 3, and the aircraft is in a compatible flight envelope, for example with dynamics of the aircraft 10 that are not excessive. In other words, the selection of the second mode M2 is possible if the dynamics of the aircraft for the considered aircraft axis do not exceed a predefined threshold; or
- the primary control member 22, 23, 24 corresponding to the considered aircraft axis is in the neutral position, the aircraft 10 is stabilized on the affected piloting axis, and the first mode M1 or the fourth mode M4 is not active for the considered aircraft axis.

According to the first embodiment, when the conditions for engaging the second mode M2 are met for the considered aircraft axis, then the second mode M2 is engaged during step 290 for only the considered aircraft axis.

According to the second embodiment, when the conditions for engaging the second mode M2 are met when one of the following conditions is true:
- the value of the acquired mechanical property D, F is comprised in the third interval 64 or the fourth interval 66 for at least one of the primary control members 22, 23, 24 corresponding to the coupled aircraft axes, the absolute value of the acquired mechanical property D, F is below the maximum bounds of the third and fourth intervals 64, 66 for the other primary control members 22, 23, 24 corresponding to the coupled aircraft axes, and the aircraft is in a compatible flight envelope, for example with dynamics of the aircraft 10 that are not too great along the coupled axes. In other words, the selection of the second mode M2 is possible if the dynamics of the aircraft 10 to the different coupled axes of the aircraft are not above respective predefined thresholds; or
- the primary control members 22, 23, 24 corresponding to the coupled aircraft axes are all in the neutral position, the aircraft 10 is stabilized on all of the coupled piloting axes, and the first mode M1 or the fourth mode M4 is not active for the coupled aircraft axes.

According to the second embodiment, when the aforementioned conditions for engaging the second mode M2 are met, then the second mode M2 is engaged during step 290 for all of the coupled aircraft axes.

At the end of step 290, the generating device 30 goes to step 240 for displaying the active assistance level, during which information relative to the selection of the second mode M2 is displayed on the screen 32 by the display software 50. The displayed active assistance level is then the VECTOR mode.

If, during step 280, the conditions for engaging the second mode M2 are not met, then the selecting software 42 goes to step 300, during which the conditions for engaging the fourth mode M4 are verified.

The conditions for engaging the fourth mode M4 are as follows:
- the primary member corresponding to the considered axis or to the coupled axes is in the neutral position along the considered direction(s); and
- the crew actuates a specific button, such as the control panel selector or the touch-sensitive key forming the secondary control member 29, or such as the additional control member 28.

According to the first embodiment, when the conditions for engaging the fourth mode M4 are met for the considered aircraft axis, then the fourth mode M4 is engaged during step 310 for only the considered aircraft axis.

According to the second embodiment, when the conditions for engaging the fourth mode M4 are met, then the fourth mode M4 is engaged during step 310 for all of the coupled aircraft axes.

At the end of step 310, the generating device 30 goes to step 240 for displaying the active assistance level, during which information relative to the selection of the fourth mode M4 is displayed on the screen 32 by the display software 50.

If, during step 300, the conditions for engaging the fourth mode M4 are not met, then the selecting software 42 goes to step 320, during which the conditions for engaging the first mode M1 are verified.

According to the first embodiment, when the conditions for engaging the first mode M1 are met for the considered aircraft axis when one of the following conditions is true:
- the value of the acquired mechanical property D, F for the primary control member 22, 23, 24 corresponding to the considered aircraft axis is zero, i.e., the corresponding primary member 22, 23, 24 is in the neutral position, and the crew 26 presses a specific button, not shown, also called "RESUME NOW", for example present on one of the primary members 22, 23, 24; or
- via the manipulation of the primary control member 22, 23, 24 corresponding to the considered aircraft axis, the crew 26 has selected a setpoint corresponding to the flight plan on the considered aircraft axis; or
- the crew 26 has selected a setpoint corresponding to the prepared trajectory on the considered aircraft axis via the actuation of secondary control members.

According to the first embodiment, when the conditions for engaging the first mode M1 are met for the considered aircraft axis, then the first mode M1 is engaged during step 330 for only the considered aircraft axis.

According to the second embodiment, when the conditions for engaging the first mode M1 are met when one of the following conditions is true:
- the primary control members 22, 23, 24 corresponding to the coupled axes of the aircraft are all in the neutral position along the considered direction(s), and the crew 26 presses the specific button, called "RESUME NOW"; or
- via the manipulation of one of the primary members 22, 23, 24, the crew 26 has selected a setpoint corresponding to the flight plan on one of the aircraft axes, while all of the other primary members 22, 23, 24 corresponding to the coupled axes are in the neutral position.

According to the second embodiment, when the aforementioned conditions for engaging the first mode M1 are met, then the first mode M1 is engaged during step 330 for all of the coupled aircraft axes.

At the end of step 330, the generating device 30 goes to step 240 for displaying the active assistance level, during which information relative to the selection of the first mode M1 is displayed on the screen 32 by the display software 50. The displayed active assistance level is then the FLIGHT PLAN mode.

If, during step 320, the conditions for engaging the first mode M1 are not met, then the selecting software 42 goes to step 240.

One skilled in the art will then understand that the notion of mode engagement corresponds to the notion of mode selection combined with the notion of priority between the modes M1, M2, M3, M4.

It is specified that the described operation is such that at least one operating mode among the first, second, third and fourth modes M1, M2, M3, M4 is always selected for each of the three axes of the aircraft. When the generating device 30 is initialized, an operating mode is selected by default for each aircraft axis, for example the first mode M1.

The generation of the resulting setpoint trajectory is then centralized within the generating device 30, which makes it possible to reduce the complexity of the man-machine interface relative to the multiple interfaces of the many separate avionics systems of the state of the art.

The generating device 30 and the generating method according to the invention thus make it possible to improve the safety of the flight of the aircraft 10 and decrease the workload for the crew 26.

The invention claimed is:

1. A method for generating a resulting setpoint trajectory of an aircraft, intended for at least one receiving system from among at least a guiding system of the aircraft, the resulting setpoint trajectory including at least one trajectory segment for at least one axis from among a lateral axis, a vertical axis and a longitudinal axis associated with the aircraft, the guiding system being configured to control the trajectory of the aircraft relative to said resulting setpoint trajectory, the aircraft comprising an electronic generating device for generating said setpoint trajectory, a flight management system and the guiding system, the generating device comprising a trajectory computing module, the method being implemented by a said generating device and comprising:

selecting at least one operating mode from among a plurality of operating modes, acquiring a setpoint trajectory prepared by the flight management system, the prepared setpoint trajectory including one or several trajectory segments for at least one axis among the lateral axis, the vertical axis and the longitudinal axis, obtaining an alternative setpoint trajectory from an element among the trajectory computing module and an external system for generating a setpoint trajectory, said external generating system being separate from the flight management system, the alternative setpoint trajectory including one or several trajectory segments for at least one axis among the lateral axis, the vertical axis and the longitudinal axis, and generating the resulting setpoint trajectory, the resulting setpoint trajectory including the segment(s) of the prepared setpoint trajectory acquired for the period of time corresponding to the selection of a first operating mode, and the segment(s) of the alternative setpoint trajectory obtained for the period of time corresponding to the selection of another operating mode.

2. The method according to claim 1, wherein the acquiring is done only when the first operating mode is selected.

3. The method according to claim 1, wherein the obtaining is done only when the other operating mode is selected.

4. The method according to claim 1, wherein when several operating modes are selected, the other operating mode takes priority relative to the first operating mode, and during the generating, the resulting setpoint trajectory is formed, for the period of time corresponding to the selection of these multiple operating modes, by the segment(s) of the obtained alternative setpoint trajectory.

5. The method according to claim 1, wherein the aircraft further includes at least one protection system of the aircraft, primary control members, one or several additional control members and secondary control members (29), and wherein, when the other selected operating mode is a second operating mode, the alternative setpoint trajectory is a trajectory computed by the trajectory computing module, based on at least one guiding setpoint, each guiding setpoint being developed from at least one constraint from a corresponding protection system or being selected by a crew of the aircraft via one of the control members.

6. The method according to claim 1, wherein the aircraft further includes primary control members, wherein the method further comprises acquiring a mechanical property relative to one of the primary control members, and wherein, when the other selected operating mode is a third operating mode, the alternative setpoint trajectory is a trajectory computed by the trajectory computing module based on the mechanical property acquired for one of the primary control members.

7. The method according to claim 1, wherein, when the other selected operating mode is a fourth operating mode, the alternative setpoint trajectory is a setpoint trajectory received from the external generating system.

8. The method according to claim 4, wherein the third operating mode takes priority over the second operating mode, the second operating mode taking priority over the fourth operating mode.

9. The method according to claim 1, wherein each operating mode is selectable independently for each axis from among the lateral axis, the vertical axis and the longitudinal axis.

10. The method according to claim 1, wherein, for each trajectory segment, at least one aeronautic characteristic of the aircraft is constant, each aeronautic characteristic being chosen from among the group consisting of: a turn radius, a route, a ground gradient, an altitude, a ground speed, a vertical speed, a roll angle, a pitch attitude, a heading, a load factor, a lateral acceleration, a roll rate, a pitch attitude rate of change, a gradient acceleration, a gradient acceleration rate of variation, a power level, a performance level, a rate of acceleration and a relative airspeed, a position and a side-slip angle.

11. The method according to claim1, wherein at least one trajectory segment includes one or several predefined way-points of the aircraft.

12. The method according to claim 1, wherein the aircraft further includes primary control members, wherein the method further comprises acquiring a mechanical property relative to one of the primary control members, and wherein selecting the operating mode is done based on the mechanical property acquired for the primary control member associated with the considered axis from among the lateral axis, the vertical axis and the longitudinal axis.

13. The method according to claim 12, wherein during the selecting, the switch to the first operating mode is done only when the primary control member associated with the considered axis from among the lateral axis, the vertical axis and the longitudinal axis is in an idle position, said idle position being a corresponding position of the primary member when it is not manipulated, said primary member including one or several idle positions.

14. The method according to claim 1, wherein during the selecting, the switch to the first operating mode is done via a specific button.

15. The method according to claim 5, wherein the guiding setpoint(s) are chosen from among the group consisting of: a turn radius setpoint, a route setpoint, a ground gradient setpoint, an altitude setpoint, a ground speed setpoint, a vertical speed setpoint, a roll angle setpoint, a pitch attitude setpoint, a heading setpoint, a load factor setpoint, a lateral acceleration setpoint, a roll rate setpoint, a pitch attitude rate of change setpoint, a gradient acceleration setpoint, a gradient acceleration rate of variation setpoint, a power level setpoint, a performance level setpoint, a ground trajectory setpoint associated with a waypoint, a relative airspeed setpoint, a side-slip angle setpoint and a position setpoint.

16. The method according to claim 1, wherein the aircraft further includes at least one protection system of the aircraft, at least one data display system,
wherein the method further comprises sending the resulting setpoint trajectory to at least one receiving system from among a guiding system, at least one protection system and at least one display system.

17. A non-transitory computer-readable medium including a computer program product including software instructions which, when implemented by a computer, implement the method according to claim 1.

18. An electronic device for generating a resulting setpoint trajectory of an aircraft intended for at least one receiving system from among at least a guiding system of the aircraft, the resulting setpoint trajectory including at least one trajectory segment for at least one axis from among a lateral axis, a vertical axis and a longitudinal axis associated with the aircraft, the guiding system being configured to control the trajectory of the aircraft relative to said resulting setpoint trajectory,
the device comprising:
a trajectory computing module for computing a trajectory,
a selecting module for selecting at least one operating mode from among a plurality of operating modes,
an acquiring module for acquiring a setpoint trajectory prepared by a flight management system, the prepared setpoint trajectory including one or several trajectory segments for at least one axis among the lateral axis, the vertical axis and the longitudinal axis,
an obtaining module for obtaining an alternative setpoint trajectory from an element among the trajectory computing module and an external generating system, the alternative setpoint trajectory including one or several trajectory segments for at least one axis among the lateral axis, the vertical axis and the longitudinal axis, said external generating system being separate from the flight management system,
a generating module for generating the resulting setpoint trajectory, the resulting setpoint trajectory including the segment(s) of the prepared setpoint trajectory acquired for the period of time corresponding to the selection of a first operating mode, and the segment(s) of the alternative setpoint trajectory obtained for the period of time corresponding to the selection of another operating mode .

19. An aircraft comprising:
an electronic generating device for generating a resulting setpoint trajectory,
a flight management system,
an external system for generating a setpoint trajectory, and
one or several guiding systems of the aircraft,
wherein the generating device is according to claim 18, the generated resulting setpoint trajectory being adapted to be sent to at least one receiving system from among the guiding system(s).

\* \* \* \* \*